United States Patent Office 3,159,546
Patented Dec. 1, 1964

3,159,546
CAPSULE SEALING COMPOSITION
John R. Kane, Jenkintown, Pa., assignor to F. G. Okie, Inc., Fort Washington, Pa., a corporation of Pennsylvania
No Drawing. Filed Oct. 12, 1962, Ser. No. 230,269
6 Claims. (Cl. 167—83)

This invention relates generally to a liquid sealant or sealing agent for gelatin capsules.

Gelatin capsules may be generally classified into two broad categories including a first category of hard-shell capsules and a second category of soft-shell capsules. Hard-shell capsules are characterized by capsule walls of sufficient rigidity to be shape-retaining under normal conditions. Gelatin is almost universally used in the manufacture of hard-shell capsules and, to the end that the necessary rigidity may be maintained, essentially pure gelatin without addition agents, except small quantities of coloring ingredients, is preferably used. In the manufacture of hard-shell capsules, plasticizers are largely avoided and, generally speaking, in no event are present in amounts exceeding about 5 percent of the dry weight of the gelatin. Soft-shell capsules, by way of contrast, are normally formulated from gelatin compositions containing plasticizers and other ingredients in an amount substantially greater than 5 percent to the end that the walls thereof may be soft and capable of welding together, whereby the capsule parts are sealed during the process of manufacture. This invention relates to a liquid composition, sealant or sealing agent useful particularly to sealing hard-shell gelatin capsules.

It is conventional to utilize hard-shell gelatin capsules to dispense predetermined dosages of drugs. Such capsules normally comprise an open-ended, generally cylindrical body portion and a cap portion adapted to telescope over and close the open end of the body portion. Both the body portion and the cap portion are conventionally provided with externally convex closed ends.

Hard-shell gelatin capsules are conventionally filled by placing powdered drugs in the body portion thereof, and thereafter fitting the top portion over the body portion. Compacted, powdered drug materials expand sufficiently in volume to exert a pressure on the inner walls of the capsules filled therewith and hence normally provide effective frictional engagement between the capsule parts such that additional sealing is unnecessary.

Of recent years, however, it has become conventional in the drug industry to fill hard-shell capsules with non-compacted solids including granular or pelletized materials, such as the so-called "timed-disintegration" pellets, which do not expand after the capsule is closed to provide a pressure effective to produce a friction seal between the capsule parts. Separation of capsules filled with such materials is a serious problem. Not only is the economic waste of the spoiled capsules per se a significant factor, but considerable expense is also entailed in the inspection of the filled capsules which is a necessary prerequisite to filling trade packages therewith. Moreover, ill will is created in the trade by the presence of separated capsules which, despite rigid inspection, inevitably appear in at least some of the trade packages placed in commerce. It is therefore necessary, particularly in respect to hard-shell capsules filled with such uncompacted or granular drug products, positively to "seal" the filled capsules to foreclose separation of the capsule parts.

As an economically feasible, practical solution to the hard-shell capsule sealing problem certain apparatus and method have been disclosed by others for sealing two-part capsules by the spot application of drops or globules of a liquid sealant at the line of juncture or sealing line between the body and the cap as the capsules move in a continuous succession past a sealing station at a high rate of speed, in the order to 60,000 to 75,000 or more capsules per hour.

An object of this invention is to provide a novel liquid sealant useful in the production of sealed, hard-shell gelatin capsules by the apparatus and method and at the high rate of speed noted above.

Accordingly, the formulation of the liquid sealant constitutes the critical feature of the invention. It is essential that the liquid sealant be so formulated that the capsules, when placed in contact therewith, are effectively sealed without material change in appearance. The liquid sealant must not make the capsules sticky or tacky so that they stick together when collected. The viscosity of the liquid sealant must be sufficiently low for effective penetration thereof into the interstices between the capsule parts, i.e., when the sealant is touched to the edge of the cap adjacent the body, it must flow by capillarity very rapidly into the area of contact between the two capsule parts, thus forming a seal, and preferably all of the sealant must enter between the contacting areas of the capsule parts. Any incidental portion deposited externally must vaporize quickly. Accordingly, the specific materials and the relative proportions thereof utilized in the liquid sealant of the invention are carefully selected to achieve the desired result.

The liquid sealant of the present invention essentially consists of a three component mixture of acetone, water and ethyl acetate. The function of the water is to "weld" together the contacting areas of the capsule parts; the function of the ethyl acetate is to promote capillarity; and the function of the acetone is to couple the water and the ethyl acetate.

The relative proportions of the three essential components of the liquid sealant are carefully adjusted to produce satisfactorily sealed capsules. More specifically, the invention contemplates a liquid sealant containing by weight from about 1 to 4½ parts, and preferably about 3 to 4½ parts, of acetone; from about 1 to 2 parts, and preferably about 1¼ to 2 parts, of water; and from about ¾ to 2¼ parts, and preferably about ¾ of a part, of ethyl acetate. Material variation from the specified relative proportions of the three ingredients of the liquid solvent contemplated by the invention results in an unsatisfactory sealed capsule product.

The liquid sealant may, of course, contain materials other than the three essential components, which are compatible with the use thereof. For example, a small percentage of propylene glycol, U.S.P., promotes penetration of the water into the body of the gelatin, and a small percentage of isopropyl alcohol, while decreasing the sealing capacity of the liquid, promotes capillarity.

As indicated hereinabove, the liquid sealant is applied in individual separate drops or globules at the line of juncture or sealing line between the body and the cap of the capsule. Normally the liquid solvent is employed at room temperature.

While in this specification reference is made to hard-shell gelatin capsules, it will be appreciated that the liquid sealant of the invention is useful in sealing hard-shell capsules generally, including all of the various types and styles of such capsules available commercially, which comprise, in the composition thereof, materials other than gelatin.

Four forms of the liquid sealant are tabulated below, the relative proportions of the components being given in parts by weight.

| Component | Acetone | Water | Propylene Glycol U.S.P. | Ethyl Acetate | Isopropyl Alcohol |
|---|---|---|---|---|---|
| Form: | | | | | |
| 1 | 3-4½ | 1¼-2 | | ¾ | |
| 2 | 1 | 1 | ¼ | 2¼ | ¼ |
| 3 | 3 | 1 | ¼ | ½ | |
| 4 | 3 | 1¼ | | ¾ | |

A fifth form of the liquid sealant is the same as the first form listed above, with propylene glycol, U.S.P., added in the amount of 10 to 20 percent by weight of the acetone, water and ethyl acetate.

Form 1 is the preferred composition, while Form 3 is preferred over Form 2. As noted hereinbefore, the use of propylene glycol, U.S.P., and isopropyl alcohol is optional.

What is claimed is:

1. A liquid sealant for gelatin capsules, said sealant consisting by weight of about 1 to 4½ parts of acetone, 1 to 2 parts of water, ¾ to 2¼ parts of ethyl acetate, from zero to about 1.45 parts of propylene glycol, U.S.P., and zero to about ¼ of a part of isopropyl alcohol.

2. A liquid sealant for gelatin capsules, said sealant consisting by weight of about 3 to 4½ parts of acetone, about 1¼ to 2 parts of water, and about ¾ of a part of ethyl acetate.

3. A liquid sealant for gelatin capsules as defined in claim 2, wherein propylene glycol, U.S.P., is added in the amount of 10 to 20 percent of the combined weights of the acetone, water and ethyl acetate.

4. A liquid sealant for gelatin capsules, said sealant consisting by weight of about 3 parts of acetone, about 1¼ parts of water, and about ¾ of a part of ethyl acetate.

5. A liquid sealant for gelatin capsules, said sealant consisting by weight of 3 parts of acetone, 1 part of water, ¼ of a part of propylene glycol, U.S.P., and ½ of a part of ethyl acetate.

6. A liquid sealant for gelatin capsules, said sealant consisting by weight of 1 part of acetone, 1 part of water, ¼ of a part of propylene glycol, U.S.P., 2¼ parts of ethyl acetate, and ¼ of a part of isopropyl alcohol.

References Cited in the file of this patent

UNITED STATES PATENTS

| | | |
|---|---|---|
| 2,211,129 | Klinkenstein | Aug. 13, 1940 |
| 2,215,898 | Anderson | Sept. 24, 1940 |
| 2,765,256 | Beals et al. | Oct. 2, 1956 |
| 2,924,920 | Margolis | Feb. 16, 1960 |
| 3,071,513 | De Boer et al. | Jan. 1, 1963 |

OTHER REFERENCES

J.A.P.A., Science Edition, vol. XLVII, No. 12, December 1958, pp. 855–856.